(12) United States Patent
Muramatsu et al.

(10) Patent No.: US 12,343,715 B2
(45) Date of Patent: Jul. 1, 2025

(54) PILLAR-SHAPED HONEYCOMB STRUCTURE

(71) Applicant: NGK Insulators, Ltd., Nagoya (JP)

(72) Inventors: Shuji Muramatsu, Nagoya (JP); Yasuhiro Shiga, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 124 days.

(21) Appl. No.: 18/180,950

(22) Filed: Mar. 9, 2023

(65) Prior Publication Data

US 2023/0311112 A1 Oct. 5, 2023

(30) Foreign Application Priority Data

Mar. 31, 2022 (JP) ................. 2022-060626

(51) Int. Cl.
*B01J 35/56* (2024.01)
*B01J 35/31* (2024.01)
*B01J 35/40* (2024.01)
*B01J 35/64* (2024.01)

(52) U.S. Cl.
CPC .............. *B01J 35/56* (2024.01); *B01J 35/31* (2024.01); *B01J 35/40* (2024.01); *B01J 35/657* (2024.01)

(58) Field of Classification Search
None
See application file for complete search history.

(56) References Cited

U.S. PATENT DOCUMENTS

| 2014/0370233 | A1* | 12/2014 | Izumi | B01D 46/00 |
| | | | | 428/116 |
| 2016/0271549 | A1* | 9/2016 | Kikuchi | B01D 46/2474 |
| 2016/0288449 | A1 | 10/2016 | Ouchi et al. | |
| 2016/0346776 | A1* | 12/2016 | Omiya | C04B 38/0006 |
| 2018/0361299 | A1 | 12/2018 | Ingram-Ogunwumi et al. | |
| 2019/0099749 | A1* | 4/2019 | Kobayashi | B01J 35/657 |

FOREIGN PATENT DOCUMENTS

| JP | 2016-190198 A | 11/2016 |
| JP | 2016-204208 A | 12/2016 |
| JP | 2019-505365 A | 2/2019 |

* cited by examiner

*Primary Examiner* — Elizabeth Collister
(74) *Attorney, Agent, or Firm* — BURR PATENT LAW, PLLC (57) ABSTRACT

A pillar-shaped honeycomb structure includes an outer peripheral side wall, and a plurality of partition walls partitioning a plurality of cells, wherein an average pore diameter of the partition walls measured by a mercury intrusion method specified in JIS R1655: 2003 is 3 to 10 μm, and when a cross-section of the plurality of partition walls is observed with an X-ray microscope and a porosity (%) is measured in a thickness direction from one surface to the other surface of each partition wall, assuming $P_{AVE}$ is an average porosity of each partition wall, $P_{1MIN}$ is a minimum porosity from the one surface to a thickness of 5% of the partition wall, and $P_{2MIN}$ is a minimum porosity from the other surface to a thickness of 5% of the partition wall, $40\% \leq P_{AVE} \leq 70\%$, and $\{(P_{1MIN}+P_{2MIN})/2\}/P_{AVE} \leq 0.9$ are satisfied.

8 Claims, 6 Drawing Sheets

PILLAR-SHAPED HONEYCOMB STRUCTURE

CROSS REFERENCE TO RELATED APPLICATIONS

The present invention claims the benefit of priority to Japanese Patent Application No. 2022-060626 filed on Mar. 31, 2022 with the Japanese Patent Office, the entire contents of which are incorporated herein by reference in its entirety.

FIELD OF THE INVENTION

The present invention relates to a pillar-shaped honeycomb structure. More particularly, the present invention relates to a pillar-shaped honeycomb structure for exhaust gas purification.

BACKGROUND OF THE INVENTION

Exhaust gases emitted from internal combustion engines such as automobile engines contain pollutants such as soot, nitrogen oxides (NOx), soluble organic fractions (SOF), hydrocarbons (HC) and carbon monoxide (CO). For this reason, in an exhaust gas system of internal combustion engines, it is common to install a pillar-shaped honeycomb structure carrying a suitable catalyst (oxidation catalyst, reduction catalyst, three-way catalyst, and the like) according to the pollutant to purify the exhaust gas.

A pillar-shaped honeycomb structure comprises an outer peripheral side wall, and a plurality of porous partition walls disposed on an inner peripheral side of the outer peripheral side wall and partitioning a plurality of cells forming flow paths from a first end surface to a second end surface. A catalyst layer containing a catalyst described above can be formed on the surfaces of the porous partition walls.

In recent years, the development of a pillar-shaped honeycomb structure capable of raising the temperature of the catalyst layer to an activation temperature in a short time after starting the engine has been advanced. In order to raise the catalyst layer to the activation temperature in a short time, it is necessary to reduce the weight of the pillar-shaped honeycomb structure. That is, it is necessary to reduce the heat capacity of the partition walls by thinning the partition walls or increasing the porosity. In these ways, the temperature of the partition walls can be raised in a short time after the exhaust gas starts to flow, and the temperature of the catalyst layer formed on the surface of the partition walls can be raised to the activation temperature in a short time. However, since there is a limit to how thin the partition walls can be, increasing the porosity is considered as a method of weight reduction. As a concern in that case, a decrease in the strength of the pillar-shaped honeycomb structure can be considered.

Under such a background, in Patent Literature 1 (Japanese Patent Application Publication No. 2016-204208), for the purpose of providing a honeycomb structure in which the temperature of the catalyst layer can be raised to an activation temperature in a short time, and cracks are less likely to occur even after repeated heating and cooling cycles, and exhaust gas purification performance is less likely to decline, the following invention is described.

A honeycomb structure, comprising polygonal grid-like cell walls, a plurality of cells surrounded by the cell walls, and a catalyst layer formed on a surface of the cell walls, wherein a plurality of recesses is formed on the cell walls; and when observing a cross-section of the cell walls, an opening ratio of openings of deep recesses, which are the recesses having a depth of 10 µm or more from the surface of the cell walls, is 10% or more, a number of narrow recesses, which are the deep recesses with the opening having a length of 8 µm or less, accounts for 10% or more of a total number of the deep recesses, and a number of wide recesses, which are the deep recesses with the opening having a length of 20 µm or more, accounts for 10% or more of the total number of the deep recesses.

In addition, Patent Literature 2 (Japanese Patent Application Publication No. 2016-190198) and Patent Literature 3 (Japanese Patent Application Publication No. 2019-505365) can be mentioned as prior literatures disclosing the porosity of honeycomb structures.

In Patent Literature 2, the following invention is described.

A honeycomb structure, comprising polygonal grid-like partition walls partitioning a plurality of cells extending from one end surface to the other end surface forming flow paths for a fluid, wherein the partition walls are formed porous with an aggregate and a binder material different from the aggregate, a surface porosity of a surface region of the partition walls from a surface of the partition walls to a depth of 15% thickness of the partition walls, and an internal porosity of an internal region from the depth of 15% thickness of the partition walls from the surface of the partition walls to a depth of 50% thickness of the partition walls are different from each other, and a difference obtained by subtracting the surface porosity from the internal porosity is more than 1.5%.

In Patent Literature 3, the following invention is described.

A particulate filter with at least one porous ceramic wall, wherein the wall has a microstructure with:

an average bulk porosity of more than 55% as measured by mercury porosimeter;

a d50 (pore diameter) of more than 16 µm, a d90 (pore diameter) of less than 37 µm, and a surface porosity, as measured by X-ray topography, of 10% or less of the bulk porosity at a midpoint of the wall.

PRIOR ART

Patent Literature

[Patent Literature 1] Japanese Patent Application Publication No. 2016-204208

[Patent Literature 2] Japanese Patent Application Publication No. 2016-190198

[Patent Literature 3] Japanese Patent Application Publication No. 2019-505365

SUMMARY OF THE INVENTION

The invention described in Patent Literature 1 pays attention to a plurality of recesses formed on cell walls (synonymous with "partition walls"), controls the depth and width of the recesses, and is intended to prevent the separation of the catalyst layer from the cell walls. It is not a technique for controlling the porosity distribution of the partition walls.

The invention described in Patent Literature 2 controls the relationship between the surface porosity of the surface region from the surface of the partition walls to a depth of 15% thickness of the partition walls, and the internal pores of the internal region from the depth of 15% thickness of the partition walls from the surface of the partition walls to a depth of 50% thickness of the partition walls. In addition, Patent Literature 2 describes that the surface porosity is in the range of 10% to 50% and the internal porosity is in the range of 20% to 75%, and that a wide range of porosities can be adopted. However, the invention described in Patent Literature 2 does not aim to reduce the weight of the pillar-shaped honeycomb structure, but rather aims to increase the heat capacity by keeping the average porosity low. Therefore, it does not specifically disclose a pillar-shaped honeycomb structure having a high overall porosity.

Since the invention described in Patent Literature 3, aims to reduce pressure loss, it requires an average bulk porosity of more than 55% and a relatively large pore diameter with a d50 of more than 16 µm. The coexistence of high porosity and large pore diameter tends to adversely affect strength. Also, if the porosity is increased for weight reduction, the catalyst will easily permeate into the inside of the partition walls. If the catalyst permeates into the inside of the partition walls, the frequency of contact between the exhaust gas flowing on the surface of the partition walls and the catalyst will decrease, and there is a possibility that the desired purification performance cannot be exhibited.

Thus, in the inventions described in Patent Literature 1 to 3, there is still room for improvement with respect to the object of achieving a good balance of the three functions regarding reducing the weight of the pillar-shaped honeycomb structure, increasing the strength, and suppressing the permeation of the catalyst into the inside of the partition walls. The present invention has been made in view of the above circumstances, and in one embodiment, an object of the present invention is to provide a pillar-shaped honeycomb structure having a partition wall structure suitable for balancing the three functions regarding weight reduction, high strength, and suppression of catalyst permeation into the partition walls.

As a result of intensive studies to solve the above problems, the inventors of the present invention have found that, regarding the partition walls constituting the pillar-shaped honeycomb structure, while increasing the average porosity for weight reduction, in order to ensure high strength and suppress the permeation of the catalyst into the inside of the partition walls, it is advantageous to locally reduce the porosity of the surface of the partition walls where stress is likely to occur, and further reduce the average pore diameter. The present invention completed based on this founding is exemplified as below.

[1] A pillar-shaped honeycomb structure, comprising an outer peripheral side wall, and a plurality of partition walls disposed on an inner peripheral side of the outer peripheral side wall and partitioning a plurality of cells forming flow paths from a first end surface to a second end surface, wherein an average pore diameter of the partition walls measured by a mercury intrusion method specified in JIS R1655: 2003 is 3 to 10 µm, and when a cross-section of the plurality of partition walls is observed with an X-ray microscope and a porosity (%) is measured in a thickness direction from one surface to the other surface of each partition wall, assuming $P_{AVE}$ is an average porosity of each partition wall, $P_{1MIN}$ is a minimum porosity from the one surface to a thickness of 5% of the partition wall, and $P_{2MIN}$ is a minimum porosity from the other surface to a thickness of 5% of the partition wall, 40%≤$P_{AVE}$≤70%, and {($P_{1MIN}$+$P_{2MIN}$)/2}/$P_{AVE}$≤0.9 are satisfied.

[2] The pillar-shaped honeycomb structure according to [1], wherein 0.6≤{($P_{1MIN}$+$P_{2MIN}$)/2}/$P_{AVE}$≤0.9 is satisfied.

[3] The pillar-shaped honeycomb structure according to [1] or [2], wherein an average thickness of the plurality of partition walls is 50 to 150 µm.

[4] The pillar-shaped honeycomb structure according to any one of [1] to [3], wherein a bending strength as measured according to JIS R1664: 2004 is 6.0 MPa or more.

The pillar-shaped honeycomb structure according to any one of [1] to [4], wherein 50%≤$P_{AVE}$≤60% is satisfied.

[6] The pillar-shaped honeycomb structure according to any one of [1] to [5], wherein a bulk density is 0.15 g/cc to 0.25 g/cc.

[7] The pillar-shaped honeycomb structure according to any one of [1] to [6], wherein the partition walls are formed of ceramics comprising 90% by mass or more of cordierite.

[8] The pillar-shaped honeycomb structure according to any one of [1] to [7], wherein a catalyst layer is provided on the surfaces of the partition walls.

According to one embodiment of the present invention, there is provided a pillar-shaped honeycomb structure having a partition wall structure suitable for balancing the three functions regarding weight reduction, high strength, and suppression of catalyst permeation into the partition walls. Accordingly, for example, by using the pillar-shaped honeycomb structure as a catalyst carrier, it is possible to exhibit the function of increasing the catalyst temperature to an activation temperature in a short time while ensuring the desired strength. In addition, since the catalyst carried on the partition walls does not easily permeate into the inside of the partition walls, the catalyst can be used efficiently.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Pillar-Shaped Honeycomb Structure>

In general, a pillar-shaped honeycomb structure has a pillar-shaped honeycomb structure portion comprising an outer peripheral side wall, and a plurality of partition walls disposed on an inner peripheral side of the outer peripheral side wall and partitioning a plurality of cells forming flow paths from a first end surface to a second end surface.

Figure 1:
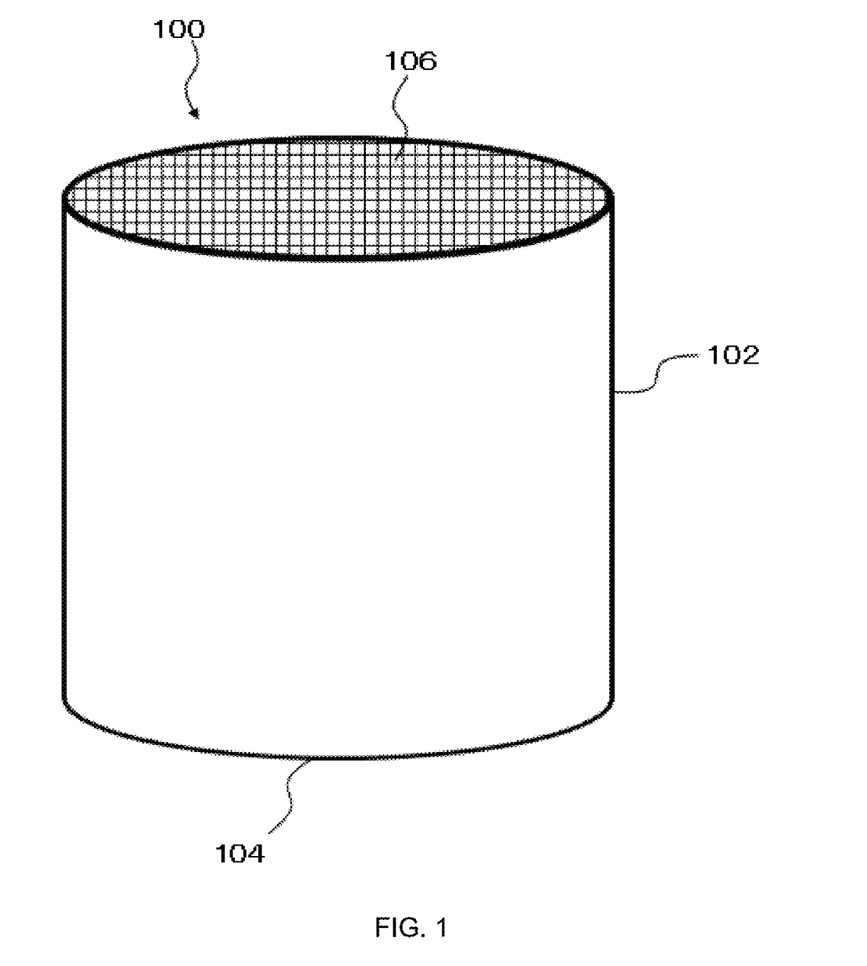
FIG. 1 is a perspective view schematically showing a wall-through type pillar-shaped honeycomb formed body.
Figure 2:
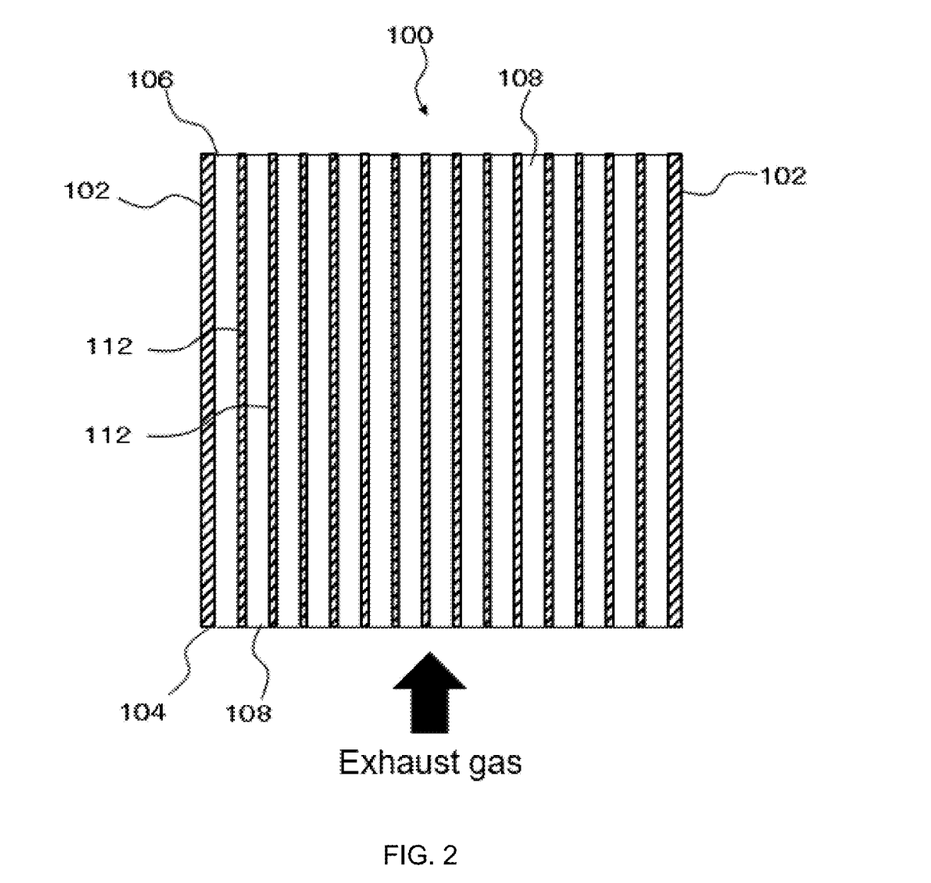
FIG. 2 is a schematic cross-sectional view of a wall-through type pillar-shaped honeycomb formed body viewed from a direction orthogonal to the direction in which the cells extend.

FIGS. 1 and 2 illustrate a schematic perspective view and a cross-sectional view, respectively, of a pillar-shaped honeycomb structure 100 that can be applied as a wall-through type exhaust gas filter and/or a catalyst carrier for automobiles. The pillar-shaped honeycomb structure 100 comprises a pillar-shaped honeycomb structure portion which comprises an outer peripheral side wall 102, and partition walls 112 disposed on the inner peripheral side of the outer peripheral side wall 102, the partition walls 112 partitioning a plurality of cells 108 forming flow paths for fluid from a first end surface 104 to a second end surface 106. In this pillar-shaped honeycomb structure 100, both ends of each cell 108 are open, and an exhaust gas flowing into one cell 108 from the first end surface 104 is purified while passing through the cell, and flows out from the second end surface 106.

Figure 3:
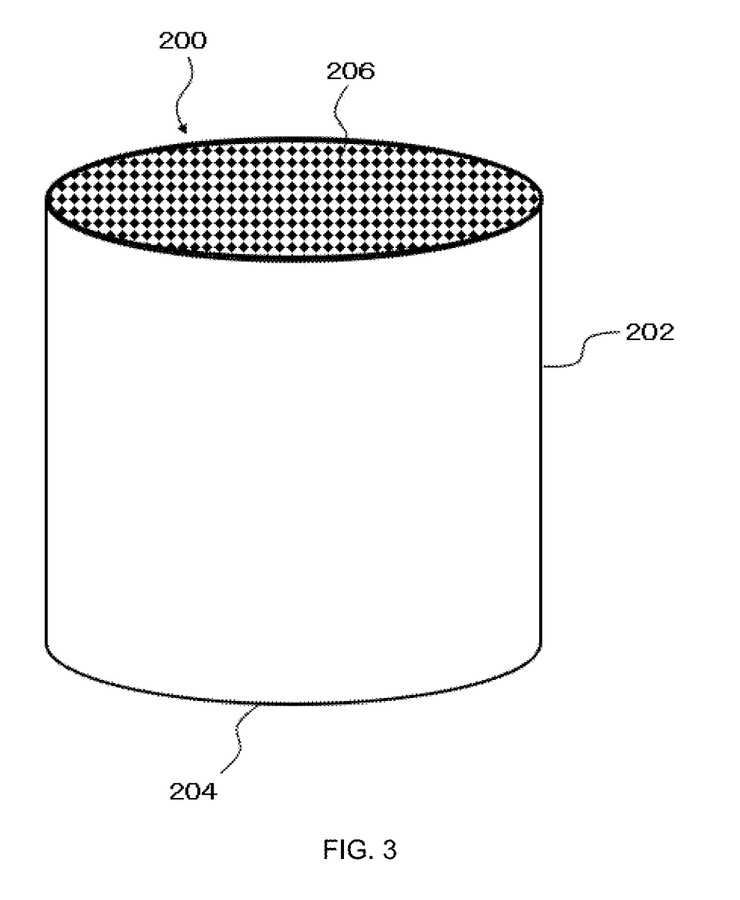
FIG. 3 is a perspective view schematically showing a wall-flow type pillar-shaped honeycomb formed body.
Figure 4:
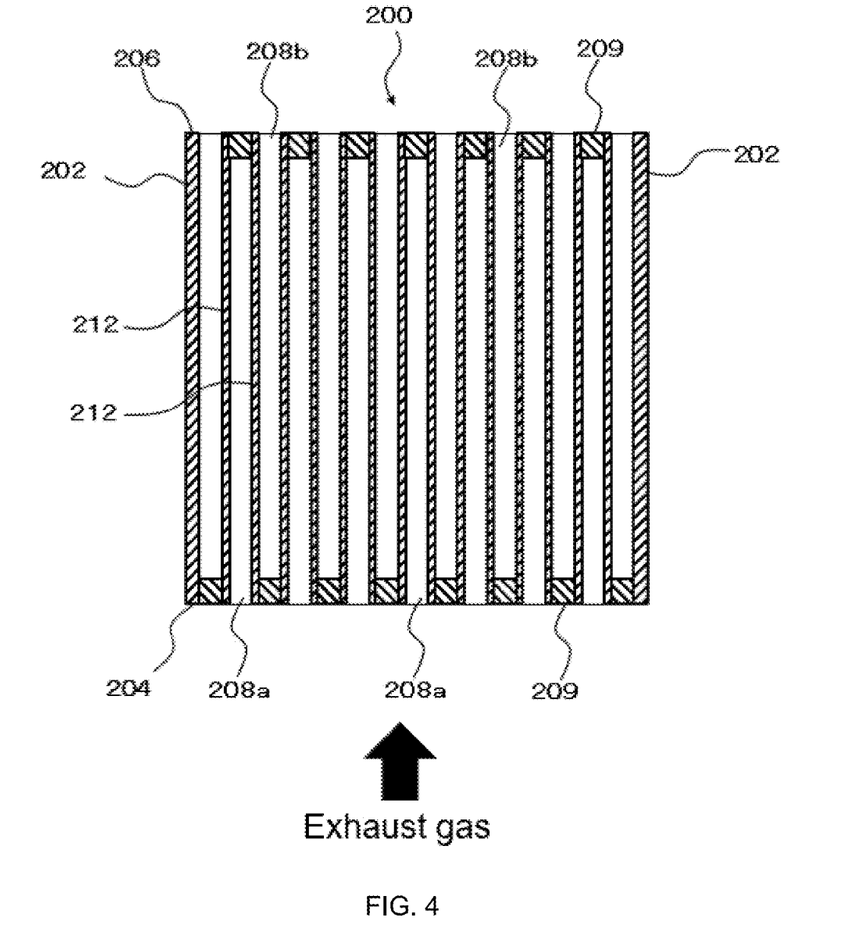
FIG. 4 is a schematic cross-sectional view of a wall-flow type pillar-shaped honeycomb formed body viewed from a direction orthogonal to the direction in which the cells extend.

FIGS. 3 and 4 illustrate a schematic perspective view and a cross-sectional view, respectively, of a pillar-shaped honeycomb structure 200 that can be applied as a wall-flow type exhaust gas filter and/or a catalyst carrier for automobiles. The pillar-shaped honeycomb structure 200 comprises a pillar-shaped honeycomb structure portion which comprises an outer peripheral side wall 202, and partition walls 212 disposed on the inner peripheral side of the outer peripheral side wall 202, the partition walls 212 partitioning a plurality of cells 208a, 208b forming flow paths for fluid from a first end surface 204 to a second end surface 206.

In the pillar-shaped honeycomb structure 200, the plurality of cells 208a, 208b can be classified into a plurality of first cells 208a disposed on the inner peripheral side of the outer peripheral side wall 202 and extending from the first end surface 204 to the second end surface 206, opening on the first end surface 204 and having sealing portions 209 on the second end surface 206, and a plurality of second cells 208b disposed on the inner peripheral side of the outer peripheral side wall 202, extending from the first end surface 204 to the second end surface 206, having sealing portions 209 on the first end surface 204 and opening on the second end surface 206. Further, in this pillar-shaped honeycomb structure 200, the first cells 208a and the second cells 208b are alternately arranged adjacent to each other with the partition wall 212 interposed therebetween.

When an exhaust gas containing particulate matter (PM) such as soot is supplied to the first end surface 204 on the upstream side of the pillar-shaped honeycomb structure 200, the exhaust gas is introduced into the first cells 208a and proceeds downstream in the first cells 208a. Because the first cells 208a have sealing portions 209 on the second end surface 206 on the downstream side, the exhaust gas penetrates the porous partition walls 212 that partition the first cells 208a and the second cells 208b and flows into the second cells 208b. Since particulate matter (PM) cannot pass through the partition walls 212, it is captured and deposited in the first cells 208a. After the particulate matter (PM) is removed, the cleaned exhaust gas that has flowed into the second cells 208b proceeds downstream in the second cells 208b and flows out from the second end surface 206 on the downstream side.

The shape of the end surfaces of the pillar-shaped honeycomb structures 100, 200 is not limited, and for example, it may be a round shape such as a circular, elliptical, racetrack and elongated circular shape, a polygonal shape such as a triangular and quadrangle shape, and other irregular shapes. The illustrated pillar-shaped honeycomb structures 100, 200 have a circular end surface shape and have a cylindrical shape as a whole.

The height of the pillar-shaped honeycomb structure (the length from the first end surface to the second end surface) is not particularly limited and may be appropriately set according to the application and required performance. There is no particular limitation on the relationship between the height of the pillar-shaped honeycomb structure and the maximum diameter of each end surface (referring to the maximum length among the diameters passing through the center of gravity of each end surface of the pillar-shaped honeycomb structure). Therefore, the height of the pillar-shaped honeycomb structure may be longer than the maximum diameter of each end surface, or the height of the pillar-shaped honeycomb structure may be shorter than the maximum diameter of each end surface.

Examples of the material constituting partition walls and the outer peripheral side wall of the pillar-shaped honeycomb structure include, but are not limited to, ceramics. As the ceramics, mention can be made to cordierite, mullite, zirconium phosphate, aluminum titanate, silicon carbide (SiC), silicon-silicon carbide composite (for example, Si-bonded SiC), cordierite-silicon carbide composite, zirconia, spinel, indialite, sapphirine, corundum, titania, silicon nitride, and the like. Further, for these ceramics one type may be contained alone, and two or more types may be contained.

In a preferred embodiment, the partition walls are formed of ceramics comprising 90% by mass or more of cordierite. This means that the total mass ratio of cordierite ($2MgO \cdot 2Al_2O_3 \cdot 5SiO_2$) in 100% by mass of the material constituting the partition walls is 90% by mass or more. The mass ratio of cordierite in 100% by mass of the material constituting the partition walls is more preferably 95% by mass or more, and even more preferably 99% by mass or more. It is also possible that 100% by mass of the material constituting the partition is cordierite, except for the unavoidable impurities.

Figure 5:
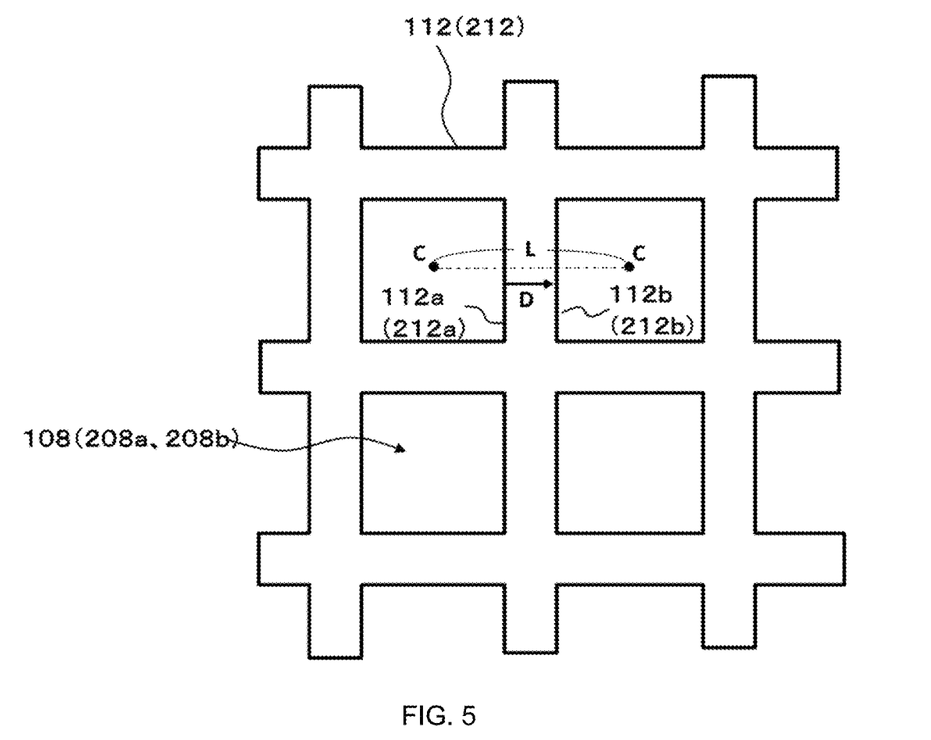
FIG. 5 is a schematic partially enlarged view of a pillar-shaped honeycomb structure observed in a cross-section orthogonal to the direction in which the cells extend.

The average thickness of the partition walls in the pillar-shaped honeycomb structure is preferably 50 μm or more, more preferably 60 μm or more, and even more preferably 70 μm or more, from the viewpoint of ensuring strength. In addition, from the viewpoint of suppressing pressure loss, the average thickness of the partition walls is preferably 150 μm or less, more preferably 130 μm or less, and even more preferably 100 μm or less. FIG. 5 shows a schematic partially enlarged view of the partition walls 112 (212) of the pillar-shaped honeycomb structure 100 (200) observed in a cross-section orthogonal to the direction in which the cells 108 (208a, 208b) extend. In the present specification, the thickness of the partition wall refers to a crossing length of a line segment L that crosses the partition wall when the centers of gravity C of adjacent cells are connected by this line segment in a cross-section orthogonal to the direction in which the cells extend (the height direction of the pillar-shaped honeycomb structure). The average thickness of the partition walls refers to the average thickness of all partition walls.

In the pillar-shaped honeycomb structure, the partition walls can be porous. The lower limit of the average pore diameter of the partition walls of the pillar-shaped honeycomb structure is preferably 3 μm or more from the viewpoint of catalyst carrying. In addition, the upper limit of the average pore diameter of the partition walls is preferably 10 μm or less, more preferably 8 μm or less, and even more preferably 6 μm or less, from the viewpoint of preventing the catalyst from permeating into the inside of the partition walls. Therefore, the average pore diameter of the partition walls is, for example, preferably 3 to 10 μm, more preferably 3 to 8 μm, even more preferably 3 to 6 μm.

As used in the present specification, the average pore diameter of partition walls means the median diameter (D50) of pore diameters measured by the mercury intrusion method specified in JIS R1655: 2003 using a mercury porosimeter. The mercury intrusion method is a method in which the sample is immersed in mercury in a vacuum state, and a uniform pressure is applied such that mercury is injected into the sample while gradually increasing the pressure, and the pore diameter distribution is calculated from the pressure and the volume of mercury intruded into the pores. When the pressure is gradually increased, mercury is intruded in the order from pores with larger diameters, and the accumulated volume of mercury increases. Finally, when all the pores are filled with mercury, the accumulated volume reaches equilibrium. The accumulated volume at this time is the total pore volume ($cm^3/g$), and the pore diameter (D50) at the time when 50% of the total pore volume of mercury is intruded is defined as the average pore diameter.

When measuring the average pore diameter of the partition walls, samples of the partition walls (cross-sectional size (length 10 mm×width 10 mm)×depth 10 mm) where the cross-section orthogonal to the direction in which the cells extend is exposed are taken from the vicinity of the center axis, the vicinity of the center in the radial direction (the vicinity of the center between the center axis and the outer peripheral wall), and the vicinity of the outer peripheral side wall (but not including the outer peripheral side wall), respectively for each of the vicinity of the first end surface, the vicinity of the center in the height direction, and the vicinity of the second end surface of the pillar-shaped honeycomb structure. The average pore diameter of each sample is measured. Then, the average value of the nine samples in total is taken as the "average pore diameter of the partition walls" of the pillar-shaped honeycomb structure to be measured.

Further, when a cross-section of a plurality of partition walls 112 (212) of the pillar-shaped honeycomb structure is observed with an X-ray microscope and the porosity (%) is measured in the thickness direction from one surface 112a (212a) to the other surface 112b (212b) of each partition wall 112 (212), assuming $P_{AVE}$ is the average porosity of each partition wall 112 (212), $P_{1MIN}$ is the minimum porosity from the one surface to a thickness of 5% of the partition wall 112a (212a), and $P_{2MIN}$ is the minimum porosity from the other surface to a thickness of 5% of the partition wall 112b (212b), it is preferable that $\{(P_{1MIN}+P_{2MIN})/2\}/P_{AVE} \leq 0.9$ is satisfied. Although the lower limit of the value of $\{(P_{1MIN}+P_{2MIN})/2\}/P_{AVE}$ is not set in particular, from the viewpoint of ease of manufacturing, it is ordinary that $0.6 \leq \{(P_{1MIN}+P_{2MIN})/2\}/P_{AVE} \leq 0.9$ is satisfied, and typically $0.7 \leq \{(P_{1MIN}+P_{2MIN})/2\}/P_{AVE} \leq 0.9$ is satisfied, and more typically $0.8 \leq \{(P_{1MIN}+P_{2MIN})/2\}/P_{AVE} \leq 0.9$ is satisfied.

From the viewpoint of reducing the weight of the pillar-shaped honeycomb structure, the lower limit of the average porosity ($P_{AVE}$) of each partition wall 112 (212) is preferably 40% or more, more preferably 45% or more, and even more preferably 50% % or more. From the viewpoint of ensuring the strength of the pillar-shaped honeycomb structure, the upper limit of the average porosity ($P_{AVE}$) of each partition wall 112 (212) is preferably 70% or less, more preferably 65% or less, and even more preferably 60% % or less. Accordingly, the average porosity ($P_{AVE}$) of each partition wall 112 (212) is, for example, preferably 40 to 70%, more preferably 45 to 65%, and even more preferably 50 to 60%.

Observation method of each partition wall with an X-ray microscope, and the measurement of $P_{AVE}$ and $\{(P_{1MIN}+P_{2MIN})/2\}/P_{AVE}$ of each partition wall are carried out according to the following procedures.

First, samples of the partition walls (cross-sectional size (length 20 mm×width 2 mm)×depth 0.3 mm) where the cross-section orthogonal to the direction in which the cells extend is exposed are taken from the vicinity of the center axis, the vicinity of the center in the radial direction (the vicinity of the center between the center axis and the outer peripheral wall), and the vicinity of the outer peripheral side wall (but not including the outer peripheral side wall), respectively for each of the vicinity of the first end surface, the vicinity of the center in the height direction, and the vicinity of the second end surface of the pillar-shaped honeycomb structure. Next, after observing the cross-section of each sample with an X-ray microscope and CT scanning, the obtained three-dimensional cross-sectional image is binarized based on the brightness, and is divided into a large number of voxels of spatial portions and base material portions (size of one voxel=a cube with a length in wall surface direction of partition wall (Y direction): 0.8 μm, a length in thickness direction of partition wall (X direction): 0.8 μm, and a length in depth direction of partition wall (Z direction): 0.8 μm).

The measurement condition of the X-ray microscope is 4-fold magnification.

The binarization process is performed by Otsu's binarization method.

Figure 6:
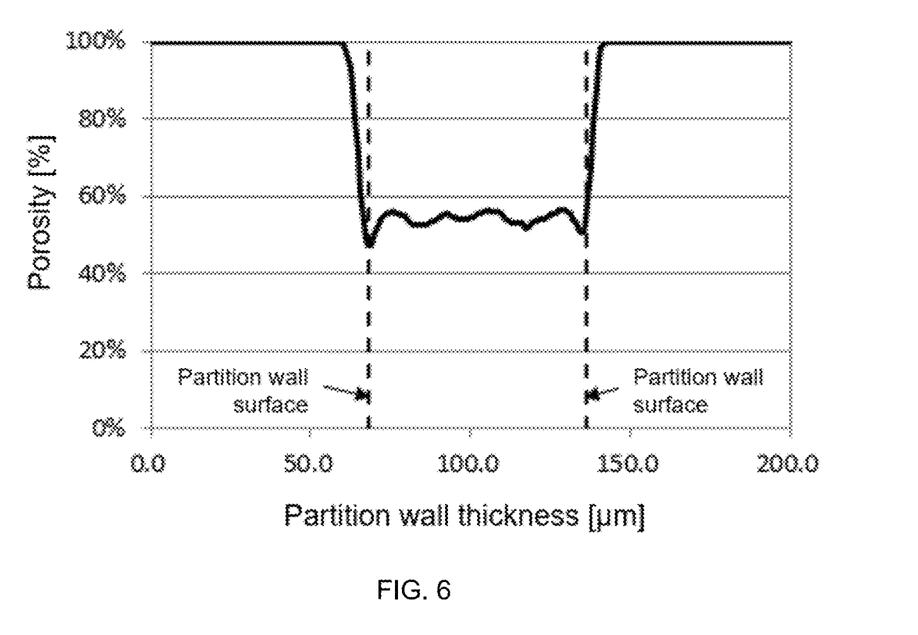
FIG. 6 is an example of a porosity profile when the porosity (%) is measured along the thickness direction D of a partition wall from one surface to the other surface.

Then, for a predetermined region (a length in wall surface direction of partition wall (Y direction): 340 μm, a length in thickness direction of partition wall (X direction): a length that includes the entire thickness and has a space of 50 μm or more on both sides of the partition wall, and a length in depth direction of partition wall (Z direction): 300 μm) of an arbitrary partition wall on the three-dimensional cross-sectional image, based on the binarized voxel data, a porosity (%) profile is obtained every 0.8 μm along the thickness direction (X direction) of the partition wall from one surface to the other surface (see FIG. 6). For the 0.8 μm thickness region (a length in wall surface direction of partition wall (Y direction): 340 μm, a length in thickness direction of partition wall (X direction): 0.8 μm, and a length in depth direction of partition wall (Z direction): 300 μm), the porosity of the 0.8 μm thickness is calculated according to the formula: porosity=(number of voxels of spatial portion)/(total number of voxels in the region)×100(%). By performing the calculation for the entire predetermined region every 0.8 μm from the left end of the screen, the porosity (%) profile at intervals of 0.8 μm along the thickness direction (X direction) of the partition wall from one surface to the other surface is obtained.

Figure 7:
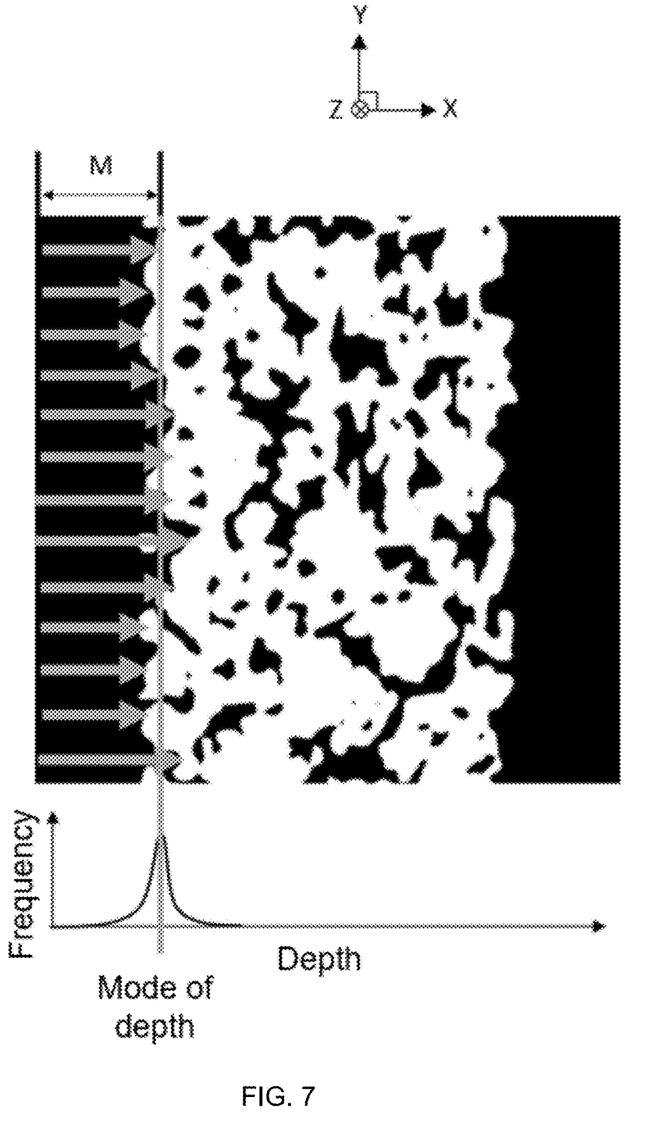
FIG. 7 is a conceptual diagram explaining a method of specifying the position of one surface of a partition wall on a cross-sectional image.

At this time, as shown in FIG. 7, the position of one surface of the partition wall is defined as the position of a mode when measuring the distance M in the thickness direction D (X direction) from a line segment parallel to the wall surface direction of the partition wall to one surface of the partition wall to be measured. The distance M is measured at intervals of 0.8 μm over the length of 340 μm in the wall surface direction (Y direction perpendicular to the thickness direction (X direction)) of the partition wall on the binarized image. The position of the other surface of the partition wall is specified in the same manner.

In this way, the porosity profile of an arbitrary partition wall is obtained from each sample, and $P_{AVE}$ and $(P_{1MIN}+P_{2MIN})/2$ of the partition wall are obtained from the profile, and $\{(P_{1MIN}+P_{2MIN})/2\}/P_{AVE}$ is calculated. Then, the average value of $P_{AVE}$ of the nine samples in total is taken as $P_{AVE}$ of the pillar-shaped honeycomb structure to be measured. Further, the average value of $\{(P_{1MIN}+P_{2MIN})/2\}/P_{AVE}$ of the nine samples in total is taken as $\{(P_{1MIN}+P_{2MIN})/2\}/P_{AVE}$ of the pillar-shaped honeycomb structure to be measured.

Further, the porosity profile of an arbitrary partition wall is obtained from each sample, and $(P_{1MIN}+P_{2MIN})/2$ of the partition wall is obtained from the profile, and the average value of $(P_{1MIN}+P_{2MIN})/2$ of the nine samples in total is taken as $(P_{1MIN}+P_{2MIN})/2$ of the pillar-shaped honeycomb structure to be measured. At this time, the upper limit of $(P_{1MIN}+P_{2MIN})/2$ is preferably 70% or less, more preferably 60% or less, from the viewpoint of ensuring strength and suppressing the permeation of the catalyst into the inside of the partition walls. Although the lower limit of $(P_{1MIN}+P_{2MIN})/2$ is not particularly set, it is generally 20% or more, typically 25% or more, from the viewpoint of ease of manufacture.

For application as an exhaust filter and/or a catalyst carrier for automobiles, the bending strength of the pillar-shaped honeycomb structure is preferably 6.0 MPa or more, more preferably 7.0 MPa or more, and even more preferably 8.0 MPa or more. Although the upper limit of the bending strength is not particularly set, it is usually 15.0 MPa or less, and typically 12.0 MPa or less. As used herein, the bending strength of the pillar-shaped honeycomb structure refers to four-point bending strength measured according to JIS R1664: 2004. It should be noted the sample size is width w 20 mm×thickness t 10 mm×total length h about 100 mm, the distance between inner fulcrums (inner span) is 20 mm, and the distance between outer fulcrums (outer span) is 60 mm. Also, the direction of the entire length of the sample is the direction in which the cell extends. The sample is taken at a location in the vicinity of the center axis and in the vicinity the center in the height direction of the pillar-shaped honeycomb structure.

The shape of the opening of the cells in the cross-section orthogonal to the direction in which the cells extend is not limited, and it is preferably quadrangle, hexagonal, octagonal, or a combination thereof. Among these, squares and hexagons are preferred. By making the shape of the opening of the cells as described above, the pressure loss when exhaust gas is allowed to flow through the honeycomb structure is reduced, and the purification performance when used as a filter is excellent. Moreover, by making the shape of the opening of the cells as described above, the pressure loss when fluid is caused to flow through the pillar-shaped honeycomb structure is reduced, and the purification performance of the catalyst is excellent.

The cell density (number of cells per unit cross-sectional area) of the pillar-shaped honeycomb structure is not particularly limited, and may be, for example, 6 to 2000 cells/square inch (0.9 to 311 cells/cm$^2$), more preferably 50 to 1000 cells/square inch (7.8 to 155 cells/cm$^2$), and particularly preferably 100 to 600 cells/square inch (15.5 to 92.0 cells/cm$^2$). Here, the cell density is calculated by dividing the number of cells of the pillar-shaped honeycomb structure by the end surface area on one side of the pillar-shaped honeycomb structure excluding the outer peripheral side wall.

The bulk density of the pillar-shaped honeycomb structure is desirably as low as possible to ensure the desired strength. The bulk density of the pillar-shaped honeycomb structure is preferably 0.15 g/cc to 0.25 g/cc, more preferably 0.15 g/cc to 0.23 g/cc, and even more preferably 0.15 g/cc to 0.20 g/cc. In this specification, the bulk density of the pillar-shaped honeycomb structure is measured by the formula: bulk density (g/cc)=mass (g) of pillar-shaped honeycomb structure/volume (cc) of pillar-shaped honeycomb structure based on external dimensions.

When the pillar-shaped honeycomb structure is used as a catalyst carrier, the surface of the partition walls can be coated with a catalyst according to the purpose. The catalyst is not limited, but mention can be made to an oxidation catalyst (DOC) for raising the exhaust gas temperature by oxidative combustion of hydrocarbons (HC) and carbon monoxide (CO), a PM combustion catalyst that assists the combustion of PM such as soot, an SCR catalyst and an NSR catalyst for removing nitrogen oxides (NOx), and a three-way catalyst capable of simultaneously removing hydrocarbons (HC), carbon monoxide (CO) and nitrogen oxides (NO$_x$). The catalyst can appropriately contain, for example, precious metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like) and the like.

<2. Method for Manufacturing Pillar-Shaped Honeycomb Structure>

A method for manufacturing a pillar-shaped honeycomb structure will be exemplified below. First, a raw material composition containing a ceramic raw material, a dispersion medium, a pore-forming agent and a binder is kneaded to form a green body. Then, by extruding the green body and drying it, a pillar-shaped honeycomb formed body can be manufactured. Additives such as a dispersant can be added to the raw material composition as needed. In extrusion molding, a die having a desired overall shape, cell shape, partition wall thickness, cell density and the like can be used.

In the drying step, conventionally known drying methods such as hot gas drying, microwave drying, dielectric drying, reduced pressure drying, vacuum drying, and freeze drying can be used. Among these, a drying method that combines hot gas drying with microwave drying or dielectric drying is preferable in that the entire formed body can be dried quickly and uniformly. The sealing portions can be formed by forming the sealing portions at predetermined positions on both end surfaces of the dried honeycomb formed body and then drying the sealing portions.

The ceramic raw material is a raw material for a portion of a metal oxide, a metal, or the like that remains after firing and constitutes the skeleton of the pillar-shaped honeycomb formed body (pillar-shaped honeycomb structure) after firing as ceramics. The ceramic raw material can be provided, for example, in the form of powder. Examples of the ceramic raw material include raw materials for obtaining ceramics such as cordierite, mullite, zirconate, aluminum titanate, silicon carbide, silicon nitride, zirconia, spinel, indialite, sapphirine, corundum, and titania. Specifically, examples include, but are not limited to, silica, talc, alumina, kaolin, serpentine, pyroferrite, bluesite, boehmite, mullite, magnesite, and aluminum hydroxide. As the ceramic raw material, one type may be used alone, or two or more types may be used in combination. From the viewpoint of reducing the porosity of the surface of the partition walls while miniaturizing the pore diameter, the median diameter (D50) of the silica particles is preferably relatively large, for example, 15 to 30 μm. On the other hand, for other ceramic raw materials, it is preferable to use fine particles having a median diameter (D50) close to the target average pore diameter of the partition walls, for example, 2 to 10 μm.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material has a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming agent is not particularly limited as long as it becomes pores after firing, and examples thereof include wheat flour, starch, foam resin, water-absorbing resin, silica gel, carbon (for example, graphite, coke), ceramic balloon, polyethylene, polystyrene, polypropylene, nylon, polyester, acrylic and phenol, and the like. As the pore-forming agent, one type may be used alone, or two or more types may be used in combination. The content of the pore-forming agent is preferably 0.5 parts by mass or more, more preferably 2 parts by mass or more, and even more preferably 3 parts by mass or more with respect to 100 parts by mass of the ceramic raw material, from the viewpoint of increasing the porosity of the honeycomb formed body. The content of the pore-forming agent is preferably 10 parts by mass or less, more preferably 7 parts by mass or less, and even more preferably 4 parts by mass or less with respect to 100 parts by mass of the ceramic raw material, from the viewpoint of ensuring the strength of the honeycomb formed body. From the viewpoint of reducing the porosity of the surface of the partition walls while miniaturizing the pore diameter, it is preferable to set the median diameter (D50) of the pore-forming agent to a relatively large value, for example, 20 to 30 μm.

Examples of the binder include organic binders such as methyl cellulose, hydroxypropyl methyl cellulose, hydroxyethyl cellulose, carboxymethyl cellulose, polyvinyl alcohol, and the like. In particular, it is preferable to use methyl cellulose and hydroxypropyl methyl cellulose in combination. Further, the content of the binder is preferably 4 parts by mass or more, more preferably 5 parts by mass or more, and even more preferably 6 parts by mass or more with respect to 100 parts by mass of the ceramic raw material, from the viewpoint of increasing the strength of the honeycomb formed body before firing. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of cracking due to abnormal heat generation in the firing process. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

The pillar-shaped honeycomb formed body may have both ends of all cells opened, as shown in FIG. 1 and FIG. 2. Further, the pillar-shaped honeycomb formed body may have a cell structure in which one end of the cells are sealed alternately, as shown in FIG. 3 and FIG. 4. The method for sealing the end surface of the pillar-shaped honeycomb formed body is not particularly limited, and a known method can be adopted.

The material of the sealing portions is not particularly limited, but ceramics is preferable from the viewpoint of strength and heat resistance. The ceramics is preferably ceramics comprising at least one selected from the group consisting of cordierite, mullite, zircon, aluminum titanate, silicon carbide, silicon nitride, zirconia, spinel, indialite, sapphirine, corundum, and titania. The sealing portions are preferably formed of a material comprising 50% by mass or more of these ceramics in total, and more preferably formed of a material comprising 80% by mass or more of these ceramics in total. It is even more preferable that the sealing portions have the same material composition as the main body portion of the honeycomb formed body because the expansion coefficient at the time of firing can be made the same and the durability can be improved.

A method of forming the sealing portion will be exemplified. A sealing slurry is stored in a storage container. Next, a mask having openings at positions corresponding to the cells on which the sealing portions are to be formed is attached to one of the end surfaces. The end surface to which the mask is attached is immersed in the storage container, and the openings are filled with a sealing slurry so that sealing portions are formed. The sealing portions can be formed on the other end surface in the same manner.

A pillar-shaped honeycomb structure can be manufactured by performing degreasing and firing on the dried pillar-shaped honeycomb formed body. As the conditions of the degreasing process and the firing process, known conditions may be adopted according to the material composition of the honeycomb formed body, and although no particular explanation is required, specific examples of the conditions are given below.

The degreasing process will be described. The combustion temperature of the binder is about 200° C., and the combustion temperature of the pore-forming agent is about 300 to 1000° C. Therefore, the degreasing step may be carried out by heating the honeycomb formed body in the range of about 200 to 1000° C. The heating time is not particularly limited, but is usually about 10 to 100 hours. The honeycomb formed body after the degreasing step is called a calcined body.

The firing process depends on the material composition of the honeycomb formed body, but can be performed, for example, by heating the calcined body to 1350 to 1600° C. and maintaining the temperature for 3 to 10 hours.

EXAMPLES

1. Manufacture of Honeycomb Structure

Examples 1 and 2, Comparative Examples 1 and 2

A cordierite-forming raw material, a pore-forming agent A, a pore-forming agent B, a binder, a dispersant, and a dispersion medium were added according to the formulation for each test number shown in Table 1, mixed and kneaded to prepare a green body. Talc, kaolin, alumina, aluminum hydroxide, silica A and silica B were used as the cordierite-forming material. Silica A and silica B had different median diameters (D50). Pore-forming agent A and pore-forming agent B also had different median diameters (D50). Water was used as the dispersion medium, a polyacrylic acid-based polymer was used as the pore-forming agent, hydroxypropylmethylcellulose was used as the binder, and a fatty acid soap was used as the dispersant. The median diameter (D50) of each material shown in Table 1 is a volume-based value measured by a laser diffraction particle size distribution analyzer (Model LA960 manufactured by HORIBA, Ltd.).

scope (Model Xradia 520 Versa manufactured by Zeiss) was used to measure the porosity profile of the partition walls according to the method described above. $P_{AVE}$, $(P_{1MIN}+P_{2MIN})/2$, and $\{(P_{1MIN}+P_{2MIN})/2\} \div P_{AVE}$ ($P_{AVE}$: average porosity in each partition wall, $P_{1MIN}$: minimum porosity from one surface to a thickness of 5% of the partition wall, $P_{2MIN}$: minimum porosity from the other surface to a thickness of 5% of the partition wall. The results are shown in Table 2.

|  |  |  | Cordierite-forming material | | | | Pore-forming agent | | | | Water |
|---|---|---|---|---|---|---|---|---|---|---|---|
|  |  |  |  |  |  | Aluminum | Silica | Silica | | | (dispersion |
|  | Material |  | Talc | Kaolin | Alumina | hydroxide | A | B | A | B | Binder | Dispersant | medium) |
|  | Median diamter (D50) |  | 10.0 | 5.0 | 5.0 | 3.0 | 5.0 | 20.0 | 10 | 25 | — | — | — |
| Test | Example 1 | Parts | 40 | 30 | 10 | 10 | 0 | 10 | 0.0 | 2.5 | 8.0 | 1.0 | 50 |
| No. | Example 2 | by | 40 | 10 | 20 | 10 | 0 | 20 | 0.0 | 4.0 | 8.0 | 1.0 | 58 |
|  | Comparative Example 1 | mass | 40 | 30 | 10 | 10 | 10 | 0 | 2.5 | 0.0 | 8.0 | 1.0 | 48 |
|  | Comparative Example 2 |  | 40 | 10 | 20 | 10 | 20 | 0 | 4.0 | 0.0 | 8.0 | 1.0 | 56 |

The green body was loaded into an extruder and horizontally extruded through a predetermined die to obtain a cylindrical honeycomb formed body. After dielectric drying and hot gas drying of the obtained honeycomb formed body, both end surfaces were cut to obtain a cylindrical honeycomb formed body having a predetermined dimension.

The cylindrical honeycomb formed body thus obtained was degreased by heating at 200° C. for 8 hours in an air atmosphere, and further fired at 1430° C. for 4 hours in an air atmosphere to obtain a pillar-shaped honeycomb structure. The required number of the pillar-shaped honeycomb structures according to each test example were manufactured for the following measurements. The specifications of the obtained pillar-shaped honeycomb structures are as follows.

Overall shape: cylindrical with a diameter of 118 mm and a height of 91 mm

Cell shape in the cross-section perpendicular to the flow direction of the cells: square Cell density (number of cells per unit cross-sectional area): 750 cells/square inch Partition wall average thickness: 2.6 mil (66 μm) (nominal value based on the die specifications)

2. Measurement of Average Pore Diameter of Partition Walls

For each pillar-shaped honeycomb structure obtained by the above manufacturing method, the average pore diameter of the partition walls was determined using Autopore 9505 manufactured by Micromeritics Instrument Corporation in accordance with the method described above. The results are shown in Table 2.

3. Measurement of Porosity Profile of Partition Walls

For each pillar-shaped honeycomb structure obtained by the above-described manufacturing method, an X-ray micro- 4. Bulk Density The bulk density of each pillar-shaped honeycomb structure obtained by the above manufacturing method was determined according to the method described above. The results are shown in Table 2.

5. Measurement of Bending Strength

The bending strength of each pillar-shaped honeycomb structure obtained by the above manufacturing method was measured using a 3366 dual column desktop type tester manufactured by Instron according to the method described above. Table 2 shows the results.

TABLE 2

| Test No. | Example 1 | Example 2 | Comparative Example 1 | Comparative Example 2 |
|---|---|---|---|---|
| Average pore diameter of partition wall (μm) | 4.3 | 4.9 | 5.6 | 4.8 |
| $P_{AVE}$ (%) | 45.2 | 54.1 | 46.2 | 52.8 |
| $(P_{1MIN} + P_{2MIN})/2$ (%) | 37.3 | 47.1 | 43.3 | 50.7 |
| $\{(P_{1MIN} + P_{2MIN})/2\}/P_{AVE}$ | 0.83 | 0.87 | 0.94 | 0.96 |
| Bulk density (g/cc) | 0.23 | 0.19 | 0.22 | 0.2 |
| Bending strength (MPa) | 8.1 | 6.3 | 6.8 | 5.4 |

When comparing Example 1 and Comparative Example 1, in which the average porosity ($P_{AVE}$) of each partition wall is close, Example 1, whose $\{(P_{1MIN}+P_{2MIN})/2\}/P_{AVE}$ was appropriate, exhibited higher bending strength. Similarly, when comparing Example 2 and Comparative Example 2, in which the average porosity ($P_{AVE}$) of each partition wall is close, Example 2, whose $\{(P_{1MIN}+P_{2MIN})/2\}/P_{AVE}$ was appropriate, exhibited higher bending strength.

DESCRIPTION OF REFERENCE NUMERALS

100: Pillar-shaped honeycomb structure
102: Outer peripheral side wall
104: First end surface 106: Second end surface
108: Cell
112: Partition wall
112a: One surface of partition wall
112b: The other surface of partition wall
200: Pillar-shaped honeycomb structure
202: Outer peripheral side wall
204: First end surface
206: Second end surface
208a: First cell
208b: Second cell
209: Sealing portion
212: Partition wall

The invention claimed is:

1. A pillar-shaped honeycomb structure, comprising an outer peripheral side wall, and a plurality of partition walls disposed on an inner peripheral side of the outer peripheral side wall and partitioning a plurality of cells forming flow paths from a first end surface to a second end surface,
wherein an average pore diameter of the partition walls measured by a mercury intrusion method specified in JIS R1655: 2003 is 3 to 10 µm, and
when a cross-section of the plurality of partition walls is observed with an X-ray microscope and a porosity (%) is measured in a thickness direction from one surface to the other surface of each partition wall, assuming $P_{AVE}$ is an average porosity of each partition wall, $P_{1MIN}$ is a minimum porosity from the one surface to a thickness of 5% of the partition wall, and $P_{2MIN}$ is a minimum porosity from the other surface to a thickness of 5% of the partition wall, $40\% \leq P_{AVE} \leq 70\%$, and $\{(P_{1MIN}+P_{2MIN})/2\}/P_{AVE} \leq 0.9$ are satisfied.

2. The pillar-shaped honeycomb structure according to claim 1, wherein $0.6 \leq \{(P_{1MIN}+P_{2MIN})/2\}/P_{AVE} \leq 0.9$ is satisfied.

3. The pillar-shaped honeycomb structure according to claim 1, wherein an average thickness of the plurality of partition walls is 50 to 150 µm.

4. The pillar-shaped honeycomb structure according to claim 1, wherein a bending strength as measured according to JIS R1664: 2004 is 6.0 MPa or more.

5. The pillar-shaped honeycomb structure according to claim 1, wherein $50\% \leq P_{AVE} \leq 60\%$ is satisfied.

6. The pillar-shaped honeycomb structure according to claim 1, wherein a bulk density is 0.15 g/cc to 0.25 g/cc.

7. The pillar-shaped honeycomb structure according to claim 1, wherein the partition walls are formed of ceramics comprising 90% by mass or more of cordierite.

8. The pillar-shaped honeycomb structure according to claim 1, wherein a catalyst layer is provided on the surfaces of the partition walls.

* * * * *